Sept. 14, 1943.  E. N. JACOBI  2,329,269
KEY CUTTING AND DUPLICATING MACHINE
Filed April 13, 1940  3 Sheets-Sheet 2
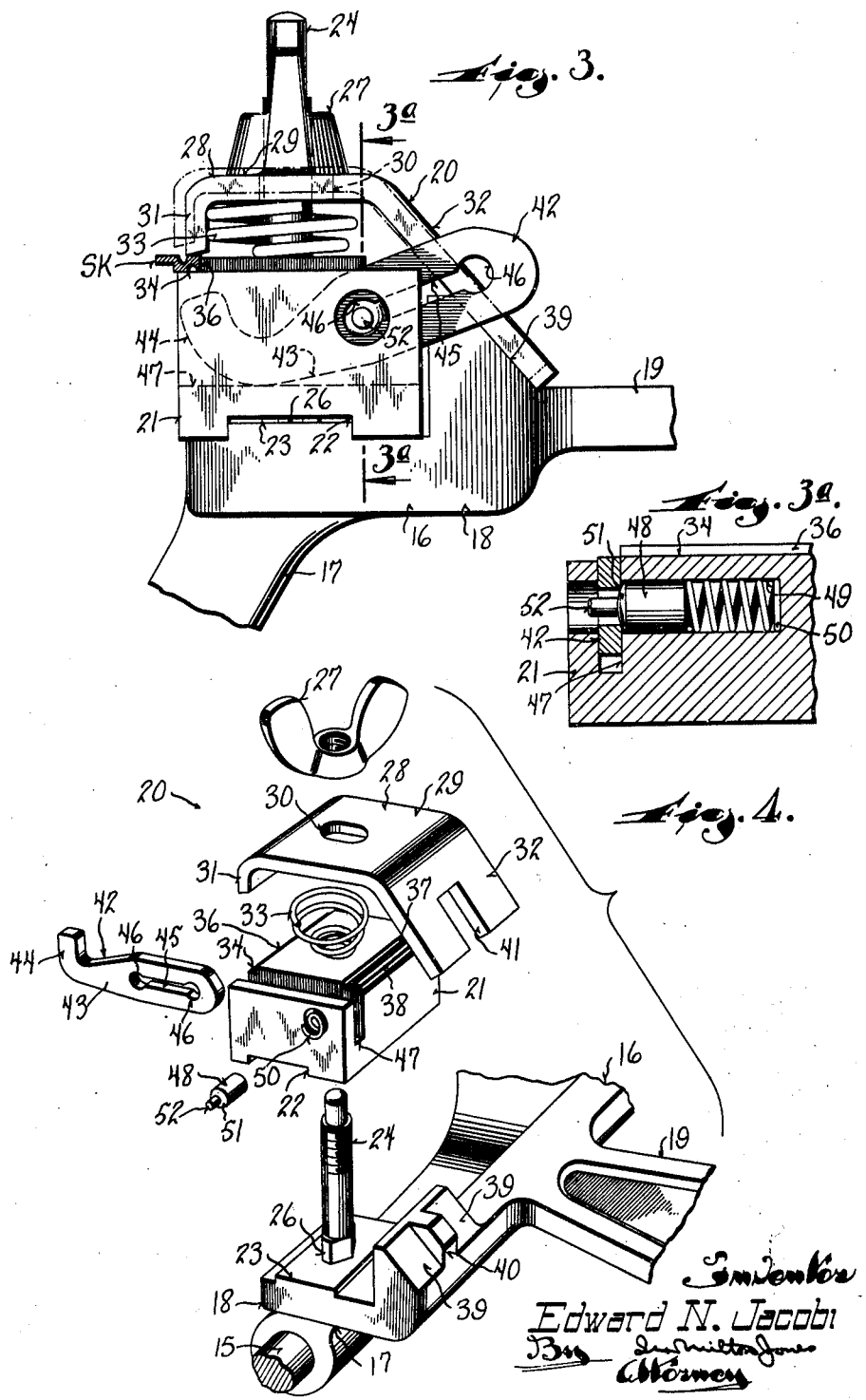
Inventor
Edward N. Jacobi Sept. 14, 1943. E. N. JACOBI 2,329,269
KEY CUTTING AND DUPLICATING MACHINE
Filed April 13, 1940 3 Sheets-Sheet 3
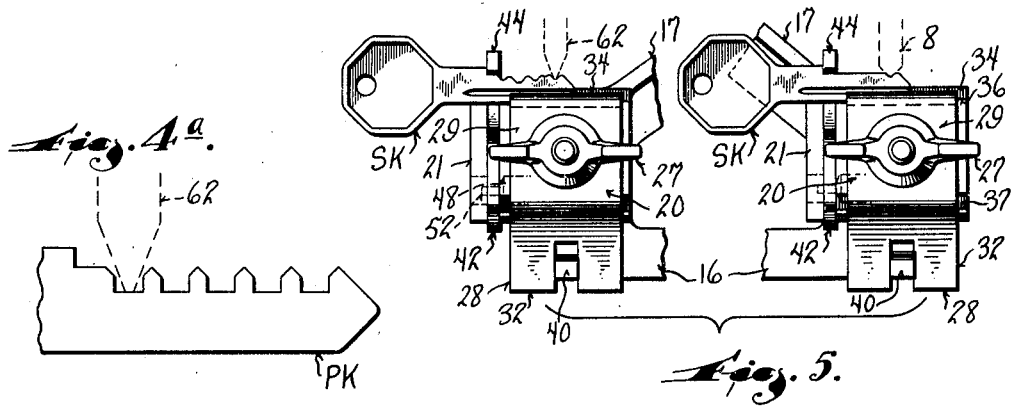
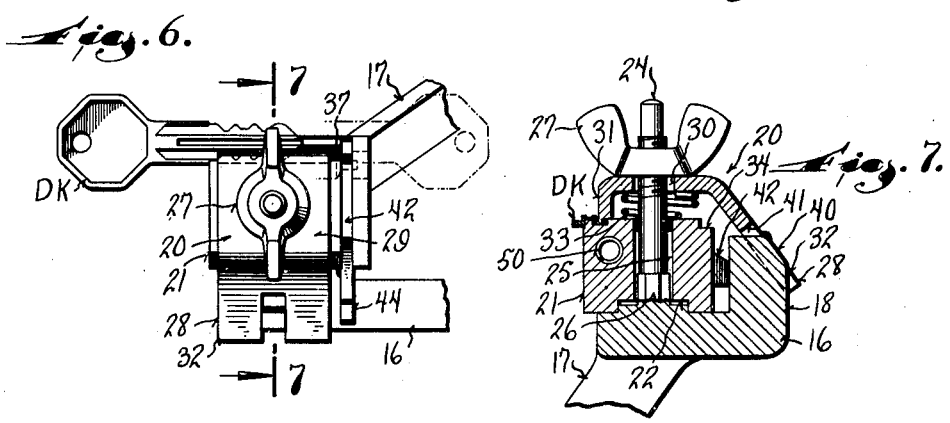
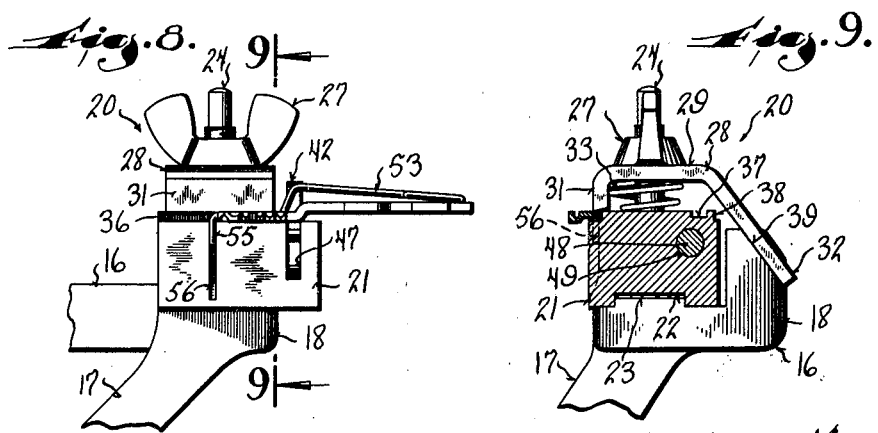
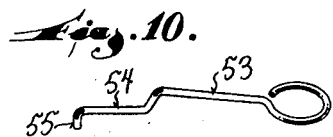
Inventor
Edward N. Jacobi

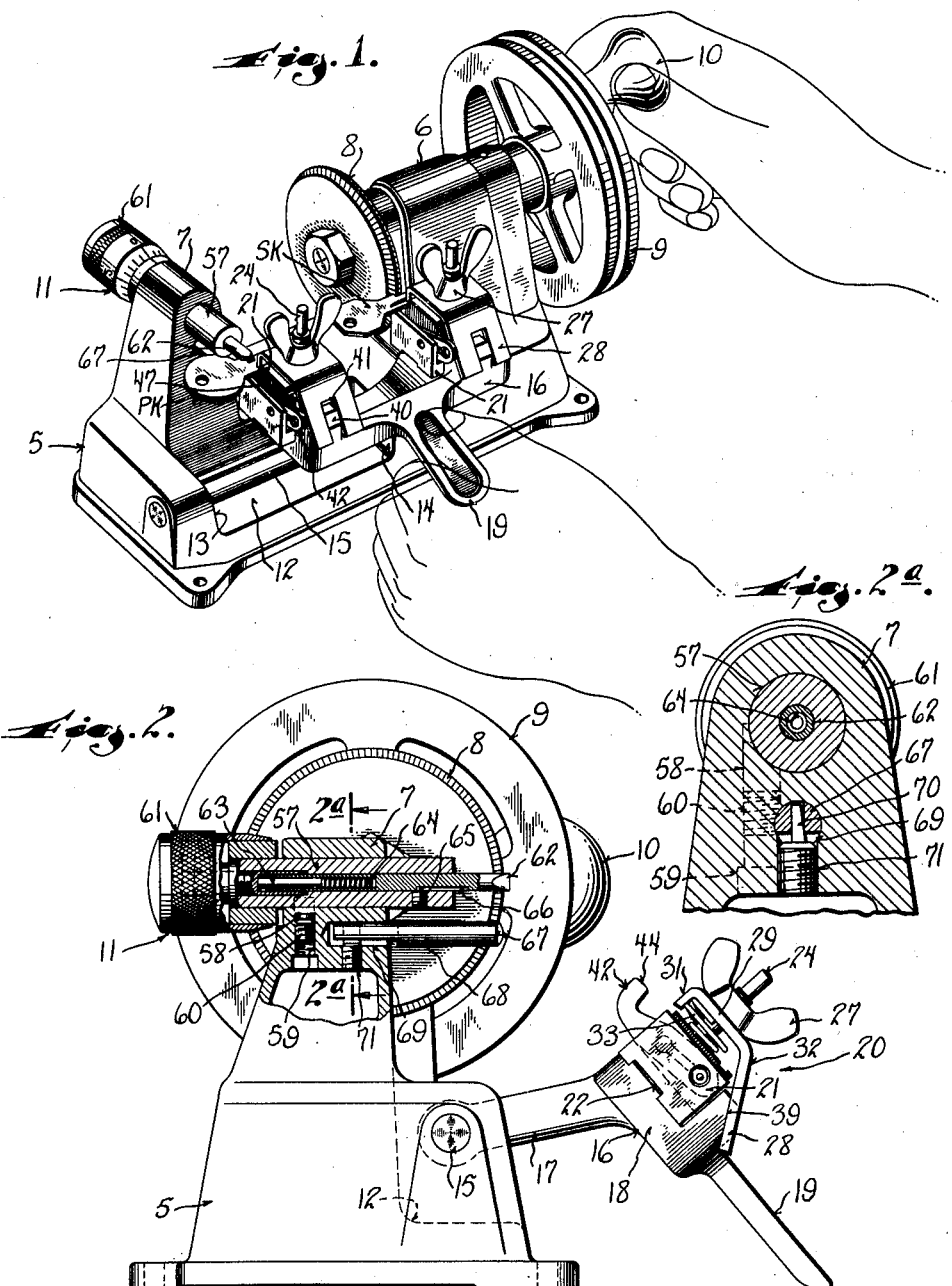

UNITED STATES PATENT OFFICE 2,329,269

KEY CUTTING AND DUPLICATING MACHINE

Edward N. Jacobi, Milwaukee, Wis., assignor to Briggs & Stratton Corporation, Milwaukee, Wis., a corporation of Delaware Application April 13, 1940, Serial No. 329,454

19 Claims. (Cl. 90—13.05)

This invention relates to key cutting and duplicating machines, and has, as a general object, the provision of an improved machine of this type capable of handling a wide variety of keys and which operates more expeditiously and accurately.

In its general aspects, the machine of this invention is like the key cutting machine illustrated in Patent No. 2,032,820, issued March 3, 1936, to C. E. Turrell.

As in the Turrell patent, the present invention contemplates a key cutting and duplicating machine having a rotary cutting tool, a carriage to which a key blank and a pattern key may be clamped, and a guide cooperable with the pattern key for gauging the location and depth of the notches to be cut into the blank as the carriage is moved toward the cutting tool.

One of the specific objects of this invention is to improve the manner in which the keys and key blanks are clamped to the carriage carried supports, especially in the case of single bitted keys which must be brought laterally against a locating shoulder.

In this respect, it is a further object of this invention to provide a key cutting machine of the character described wherein the key or blank is automatically drawn against the locating shoulder upon tightening of the clamp by which it is secured in place.

Another object of this invention is to provide an improved manner of locating the keys and blanks lengthwise on their supports.

Another object of this invention is to provide removable and reversible base blocks for the carriage having different types of key positioning means at opposite edges thereof so that by merely reversing the position of the blocks, a greater variety of keys can be accommodated.

Another object of this invention is to provide a stop for positively precluding engagement of the carriage with the cutting tool and to provide simple but effective means for locking this stop in any position of adjustment.

A further object of this invention resides in the provision of a micrometer type guide finger which cooperates with the pattern keys to locate the blanks, and which incorporates a spring pressed plunger that allows cooperative engagement between the guide finger and the pattern key before the key blank is brought into contact with the cutting tool.

With the above and other objects in view, which will appear as the description proceeds, this invention resides in the novel construction, combination and arrangement of parts substantially as hereinafter described, and more particularly defined by the appended claims, it being understood that such changes in the precise embodiment of the herein disclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a perspective view of a key cutting and duplicating machine constructed in accordance with this invention and illustrating its manner of use;

Figure 2 is an end view of the machine with parts broken away and in section to illustrate particularly the construction of the guide finger;

Figure 2a is a detail sectional view taken through Figure 2 on the plane of the line 2a—2a;

Figure 3 is an enlarged end view of one of the vises of the carriage;

Figure 3a is a detail sectional view taken through Figure 3 on the plane of the line 3a—3a;

Figure 4 is a perspective view of the elements of one vise and the adjacent portion of the carriage;

Figure 4a is a plan view of a pattern key and showing the manner in which the guide finger engages the same;

Figure 5 is a top plan view of the two vises of the key carriage showing a master key and a key blank of the single bitted type in position;

Figure 6 is a top plan view of one of the vises showing a double bitted key in position;

Figure 7 is a cross sectional view through Figure 6 on the plane of the line 7—7;

Figure 8 is a front view of one of the vises showing the manner in which a single bitted key having an offset blade is located lengthwise;

Figure 9 is a detail sectional view through Figure 8 on the plane of the line 9—9; and Figure 10 is a perspective view of the locating gauge used with keys of the type shown in Figures 8 and 9.

Referring now particularly to the accompanying drawings, in which like numerals indicate like parts, the numeral 5 designates the base of the key cutting and duplicating machine which is preferably a casting and has two pedestals 6 and 7 projecting upwardly therefrom. The pedestal 6 has the shaft of a rotary cutting tool 8 journalled therein with the tool positioned at the inner end of the pedestal.

At the outer end of the pedestal 6, the cutter shaft has a pulley 9 secured thereto. This pulley is grooved for the reception of a belt, if the machine is to be power driven, and has a crank 10 for manual operation.

The pedestal 7 has a micrometer type locating finger, indicated generally by the numeral 11, mounted therein.

At its front, the base has a recess 12. The ends of this recess are defined by walls 13 and 14. These walls have aligned bearings for the reception of a carriage shaft 15. The carriage shaft 15 is slidable and rotatable in its bearings and has a carriage 16 fixed thereto.

The carriage 16 preferably is a casting formed with two diverging arms 17, the lower ends of which merge into a boss secured to the shaft 15. The outer ends of the two diverging arms are shaped to provide saddles or seats 18, and are bridged by a cross piece from which a handle 19 projects. The saddles or seats 18 have the key gripping vises, indicated generally by the numeral 20, mounted thereon and are spaced apart a distance corresponding to the space between the cutting tool and the guide finger 11.

The two key gripping vises are identical in construction. Hence, the description of one will suffice for both. It consists of a base block 21 preferably of hardened steel having a square shouldered groove or channel 22 in its undersurface which accurately fits a tongue or gib 23 formed on the top face of the saddle or seat 18.

In this manner, the base block is accurately located on the saddle or seat against lateral movement in a direction normal to the axis of rotation of the cutting tool.

Rising up from and secured to the seat or saddle is a stud 24. This stud passes through a hole 25 in the base block and is smaller in diameter than the hole 25 so as not to interfere with the locating function of the tongue and groove; but at the base of the stud is an enlargement 26. This enlargement has a minor dimension in a transverse direction less than the diameter of the hole 25, and a major dimension in the longitudinal direction substantially equal to the diameter of the hole 25. The enlargement 26 thus serves to accurately locate the base block in a longitudinal direction parallel with the interengaged tongue and groove.

The upper end of the stud 24 is threaded for the reception of a wing nut 27 by which a clamping member 28 is drawn down onto the base block 21 to clamp a key or key blank in position. The clamping member 28 is in the form of a hardened metal strap having a medial portion 29 apertured, as at 30, for the reception of the stud 24, a downwardly projecting jaw 31 at the front edge of the clamping member, and an inclined tail portion 32.

A spiral helical spring 33 having its small diameter end seated in the upper end of the bore 25 engages the underside of the clamping member to yieldingly urge the same away from the base block and open the vise formed by the base block and clamping member.

The base block may be mounted on the seat or saddle 18 in either one of two operative positions. Reversal of its position is quickly effected by merely removing the wing nut 27 and lifting the entire vise assembly high enough to permit rotating it about the stud.

In each of its two operative positions, the edge portion of the base block facing the guide and cutting tool overhangs the seat or saddle; and at one of these two edges, which so overhangs the seat or saddle, the upper surface of the base block is stepped, as at 34.

The tread of this step provides a shelf or ledge upon which a key or key blank may rest while the riser of the step provides a locating shoulder or abutment 36 against which the straight back edge of a key or key blank may be brought to bear to properly locate the key or key blank transversely.

As best shown in Figure 3, the height of the step is slightly less than the thickness of the keys for which this machine is designed. Hence, no obstruction exists behind the key or key blank. The purpose of having the space above the base block and behind the key or blank in position thereon unobstructed will be brought out hereinafter.

The stepped edge of the base block just described accommodates single bitted keys and key blanks SK, such as shown in Figure 5. These keys and key blanks have a straight back edge which, as stated, is engaged against the locating shoulder or abutment 36.

The opposite edge of the base block has a rather wide groove 37 in its top surface which provides a narrow sharply defined ridge 38. This ridge 38 is of a size to fit snugly in the longitudinal groove of double bitted keys and key blanks DK shown in Figures 6 and 7.

In every instance, the key or key blank is held down on the base block by the jaw or clamping portion 31 of the clamping member upon tightening of the wing nut 27.

In the case of double bitted keys, the engagement of the ridge 38 in the longitudinal groove of the key or blank accurately locates the key transversely. Hence, it is only necesary for the clamping member to engage the key or key blank with a direct downward clamping action.

In the case of single bitted keys where proper transverse location depends upon having the back edge of the key or blank brought firmly against the locating shoulder or abutment, the clamping member in addition to its downward clamping movement, has a lateral or transverse motion imparted to it to frictionally draw the key against the shoulder or abutment.

When the clamping member is raised off the base block by the spring 33 and the vise may be said to be open, the clamping jaw portion 31 is yieldingly held outwardly laterally away from the locating shoulder or abutment by the novel formation of the spring 33.

The largest coils of the spring, it will be observed, are eccentric to the small coils which engage in the hole 25 and the direction of this eccentricity is such that the outer large diameter coils engage the inner face of the clamping portion 31 of the clamping member to urge the clamping member forwardly to the extent permitted by the play between its hole 30 and the stud 24, providing the wing nut is loosened.

The inclined tail portion 32 of the clamping member slidably engages an inclined surface 39 on the seat or saddle 18. Hence, as the wing nut is tightened, the jaw 31 of the clamping member first engages the key outwardly or forwardly of its final position and then, as the clamp is progressively tightened and the tail portion 32 slides down the incline 39, the jaw is drawn back towards the locating shoulder; and inasmuch as the top of the key or blank is at least flush with the top of the base block so that no obstruction exists to the rearward motion of the clamping jaw, it maintains an increasingly greater frictional engagement with the key or blank to pull it back against the locating shoulder or abutment.

An interengaging lug and slot 40 and 41 on the seat or saddle and the clamping member, respectively, holds the clamping member against turning as the nut is tightened down, the slot being long enough so as not to interfere with the downward rearward sliding of the clamping member tail portion as described.

Proper and accurate lateral location of the keys and key blanks is thus assured for all types of keys now in general use, but the keys and blanks must be properly and accurately located longitudinally as well.

In the case of double bitted keys which have shoulders at both edges, accurate longitudinal location is assured by bringing the shoulder at the edge which is rearmost, firmly against the adjacent side of the base block, as shown in Figure 6.

For single bitted keys which do not have a shoulder on the back edge of the key, a novel retractable stop 42 is provided. This stop consists of a lever 43 having a hook 44 on its outer end and a longitudinal slot 45 in its inner end portion. The ends of this slot are enlarged, as at 46.

The lever 42 is received in an open slot or recess 47 in one end of the base block, the width of the slot or recess 47 being but slightly greater than the thickness of the lever so that the lever is firmly held against sidewise play even when its hooked outer end is projected to operative key engaging position shown in Figure 5.

The lever is releasably and adjustably retained in position by a spring pressed plunger 48 received in a bore 49 in the base block. A spring 50 yieldingly urges the plunger outwardly to maintain its outer rounded end 51 in engagement with the edges of the slot in the lever. Being larger in diameter than the enlargements 46 at the ends of the slot 45, the spring plunger cannot pass therethrough, but bears against the edges of the slot at all times. The stop is thus held against vibration, and when the plunger engages in one of the enlargements 46, it provides a pivot to facilitate the tilting of the stop up or down, as required.

As will be readily apparent, assembly of the stop with the base block is quickly and easily effected by merely pushing the plunger into its well or bore 49 until it lies wholly within the confines thereof. This permits the lever to be slid across the outer end of the plunger. To facilitate depression of the plunger, a tip 52 projects from its outer rounded end.

In using the stop 42, it is pushed forwardly and upwardly to engage its hook 44 with the usual shoulder on the bitted edge of the key, as clearly illustrated in Figure 5. After the key has been located, the stop lever is pushed back, which is not only desirable but necessary; for being of hardened metal, it would be objectionable to permit the cutting tool to contact the same.

The stop 42 is satisfactory for practically all single bitted keys; but for some special keys, such as the offset key shown in Figure 8, the stop 42 cannot be used. Endwise location in this instance is effected by means of a simple gauge 53 which, as clearly shown in Figure 10, is formed of wire.

This gauge is applied to the key or blank so that its straight outer end portion 54 lies in the longitudinal groove of the key or blank and its down-turned end 55 engages in a transverse slot or notch 56 in the base block. The nose or point of the key is then brought against the end 55 to effect the locating function.

The presence of the gauge portion 54 in the groove of the key or blank protects the same from possible deformation by the jaw of the clamping member, as shown in Figure 9.

As noted hereinbefore, there are two vises mounted on the swinging longitudinally movable carriage so that a blank gripped in the right-hand vise may be brought to bear against the cutting tool in the manner shown in Figure 1 to cut notches of a depth and at the locations determined by the engagement of a pattern or master key gripped in the other vise with the guide finger 11.

This guide finger is of the micrometer type shown in the Turrell patent referred to hereinbefore. It consists merely of a main tubular shaft 57 received in a bore in the pedestal 7 where it is locked against displacement by a wedge 58 having a surface bearing tangentially against the side of the tubular shaft. The wedge 58 is seated in the inner end of a bore 59 which is threaded to receive a pressure screw 60 by which the wedge is forced against the shaft 57.

Mounted on the rear end of the tubular shaft 57 is the micrometer mechanism 61 which has the usual outer barrel provided with the graduations that coact with graduations on an inner barrel in the customary manner.

The guide finger per se, indicated by the numeral 62, is connected with the micrometer mechanism in a novel manner. It comprises a spring pressed plunger bored at its inner end to receive the central stem 63 of the inner micrometer screw and a spring 64 confined between the bottom of the bore and the end of this stem.

A stop 65 secured in the shaft 57 and engaging in a groove 66 in the spring plunger limits the outward spring propelled motion of the plunger. The extent to which the spring plunger may be depressed depends upon the setting of the micrometer mechanism, being limited to the distance between the inner end of the plunger and a shoulder at the base of the stem 63.

The spring plunger at all times projects far enough to engage the pattern or master key before the blank to be cut comes in contact with the cutting tool. This facilitates proper endwise location of the notch to be cut for it holds the carriage against shifting during the start of the cut. As the cut is made, the plunger, of course, is pushed in against its spring to the extent determined by the setting of the micrometer mechanism.

When a key is to be cut to a given code number or combination, a pattern key PK (see Figure 4a) is clamped in the left-hand vise and the proper blank is secured in the right-hand vise. The pattern key, as will be noted, has all of its notches of the same depth as it merely locates the notches to be cut lengthwise of the blank.

With the pattern key and blank secured in position, the micrometer mechanism is set to allow the cutting of the first notch to the required depth as determined from the key code charts available to key service men. The carriage is then lifted or swung upwardly to begin the cutting operation. As the carriage is raised, the first notch of the pattern key is brought into engagement with the spring plunger and as the feeding motion of the carriage continues, the key blank is pressed against the rotating cutting tool.

Inasmuch as the cutting tool is thin enough to cut the narrowest notch used in present keys and as the width of the notches varies in different types of keys, the notches in the pattern key are so formed that the bottom thereof engages the point of the spring guide plunger; and where a wide notch is required, the width of the notch in the pattern key is correspondingly wider than the point of the guide plunger thus allowing the carriage to be shifted longitudinally to cut the notch to the proper width.

This is the procedure followed in cutting keys to code combinations.

For duplicating, the micrometer mechanism is set to a proper zero position and the key to be duplicated is secured in the left-hand vise in place of a pattern key whereupon the cutting operation follows in the same sequence and results in the duplication of the master key.

In actual practice, the operators of machines of this type do not handle them gently. It is, therefore, important that a stop be provided to prevent banging the carriage against the cutting tool; and as the diameter of the cutting tool changes due to resharpening, the stop used to limit the carriage motion must be adjustable. The provision of an adjustable stop for this purpose which would withstand the hard usage to which these machines are put, theretofore has always been a serious problem.

In the present invention, an adjustable stop 67 of extremely simple construction is positively secured against dislocation after it has been set. It consists merely of a round stem or rod 68 received in a bore 69 drilled into the pedestal under and parallel with the micrometer guide pin.

The inner end of the stem 68 which is received in the bore has its undersurface slabbed off and is bifurcated on a plane substantially normal to the flat face formed by slabbing off the rod.

A wedge 70 is forced between the arms of the bifurcated inner end of the rod by a set screw 71 threaded into a cross bore and accessible from the underside of the base, as clearly shown in Figures 2 and 2a. This construction positively locks the stop against displacement.

From the foregoing description taken in connection with the accompanying drawings, it will be readily apparent that this invention provides a key cutting and duplicating machine having many improvements over past machines designed for this purpose and that by virtue of these improvements, more accurate cutting and duplicating of keys is made possible.

What I claim as my invention is:

1. In a key cutting and duplicating machine: means for gripping keys and key blanks comprising, a base having a step in one edge of its top surface to provide a ledge upon which the key or key blank may rest, and a positioning shoulder against which the back edge of the key or key blank is engageable, said step having a depth substantially no greater than the thickness of the key or key blank so that the upper surface of a key or key blank in position is substantially flush with the top surface of the base; a clamping member positioned above the base and having a key engaging portion adapted to engage the top surface of a key or key blank in position; means for loosely holding the clamping member in position above the base, said means enabling a degree of lateral motion of the clamping member across the top surface of the base; means for forcing the clamping member toward the base; and means for imparting lateral motion to the clamping member as the clamping member is forced toward the base, in a direction to draw its key engaging portion across the top of a key or key blank toward the positioning shoulder.

2. In a key cutting and duplicating machine: a key guiding carriage having means for gripping a key or key blank comprising, a reversible base having opposite edge portions for supporting keys and key blanks thereon; a shoulder on each of said edge portions engageable with divers keys and key blanks for locating the same in predetermined positions on the base; a clamping member disposed above the base and having a key engaging portion arranged to overlie one of said edge portions in either position of the reversible base and adapted to press down on the top surface of a key or blank to clamp the same against one of said edge portions of the base; means for loosely supporting the clamping member above the base; said means allowing the clamping member to move laterally across the base; a spring yieldingly urging the clamping member upwardly away from the base and laterally in a direction to move its key engaging portion away from the shoulder adjacent to the key engaging portion of the clamping member so that upon initial tightening of the clamping member, its key engaging portion engages the key or key blank outwardly of said shoulder; means for tightening the clamping member to effect the clamping action; and cooperating surfaces on the clamping member and the carriage for drawing the clamping member laterally across the base in either position of the reversible base on the carriage in a direction to slide the key engaging portion of the clamping member over the top surface of the key or key blank toward the shoulder adjacent to said key engaging portion of the clamping member.

3. In a key cutting and duplicating machine: a key guiding carriage having means for gripping a key or key blank comprising, a reversible base having opposite edge portions for supporting keys and key blanks thereon; a shoulder on each of said edge portions engageable with divers keys and key blanks for locating the same in predetermined positions on the base; a clamping member disposed above the base and having a key engaging portion arranged to overlie one of said edge portions in either position of the reversible base and adapted to press down on the top surface of a key or key blank to clamp the same against one of said edge portions of the base; means for loosely supporting the clamping member above the base, said means allowing the clamping member to move laterally across the base; a spring yieldingly urging the clamping member upwardly away from the base and laterally in a direction to move its key engaging portion away from the shoulder adjacent thereto so that upon initial tightening of the clamping member, its key engaging portion engages the key or key blank outwardly of the shoulder adjacent to said key engaging portion of the clamping member; means for tightening said member to effect the clamping action; and cooperating parts on the carriage and clamping member having portions slidably engageable on a downwardly rearwardly inclined plane so as to draw the key engaging portion of the clamping member rearwardly during tightening of the clamping member toward the shoulder adjacent thereto in either position of the reversible base on the carriage.

4. In a key cutting and duplicating machine: a movable carriage; a reversible key carrying block having different types of key supporting means at opposite edges thereof including an abutment on each of said key supporting means engageable with sundry keys and key blanks for locating the same in predetermined positions on the block; a clamping member overlying the block and having two downwardly projecting spaced portions, one of which constitutes a key engaging jaw adapted to overlie one of said supporting means in either position of the reversible block and the other of which has an inner surface inclined to the general top plane of the block; a spring acting between the block and said clamping member to yieldingly urge the clamping member upwardly away from the block and laterally across the block to move the jaw of the clamping member away from the abutment therebeneath so that upon initial downward clamping movement of the clamping member, its jaw engages the key or key blank outwardly of said abutment; means for forcing the clamping member toward the block to effect the clamping action; and a surface on the carriage engaged by the inclined inner surface of the clamping member to cause the clamping member to move laterally across the block in either position of the reversible block during the clamping action in a direction to draw its jaw across the key toward the abutment adjacent thereto.

5. In a key cutting and duplicating machine: a key guiding carriage having means for gripping a key or key blank comprising, a reversible base seated on said carriage and having opposite edge portions for supporting keys and key blanks thereon; a shoulder on each of said edge portions for accurately locating various keys and key blanks with respect to the base; a clamping member disposed above the base and having a downwardly projecting key engaging portion located substantially above one of said edge portions and shoulders in either position of the base; a spring acting between the base and said clamping member to exert an upward component on the clamping member to yieldingly lift the same off the base and a lateral component acting on the clamping member to urge its key engaging portion outwardly away from the shoulder adjacent thereto; a seat on the carriage to receive the base; a stud fixed to the seat, the base and clamping member having openings to receive the stud and the opening in the clamping member being large enough to enable the clamping member to move laterally with respect to the base; a clamping nut threaded on said stud for drawing the clamping member down toward the base; and cooperating means on said clamping member and seat for imparting lateral motion to the clamping member in a direction to draw its key engaging portion toward the shoulder adjacent thereto during the clamping action in either position of the reversible base.

6. In a machine for working on keys and key blanks: clamping means for gripping a key or key blank including, a base having means for positioning a key or key blank transversely, said base having a slot disposed transversely to the position of a key or key blank thereon; a stop for locating the key or key blank lengthwise on the base comprising, a lever disposed in the slot of the base to be guided by the side walls of the slot and firmly held thereby against lateral movement; means for pivotally securing said lever in the slot at a point spaced substantially from the position of a key or key blank on the base; and means on the outer end of the lever engageable with a shoulder on the key or key blank to locate the same lengthwise.

7. In a machine for operating upon keys and key blanks: clamping means for holding the key or key blank firmly in a definite position, said clamping means including, a base upon which the key or key blank rests; an abutment on the base for defining the transverse position of the key or key blank on the base, said base having a slot transverse to said abutment; a lever having a hooked end portion and received in said slot to be held by the side walls thereof against lateral motion; and means for movably retaining the lever in said slot in a manner enabling its hooked end portion to be engaged with a shoulder on a key or key blank to locate the same lengthwise on the base.

8. In a machine for operating upon a key or key blank and wherein accurate positioning of the key or key blank is necessary: a retractable stop for gauging and locating the key in a lengthwise direction comprising, spaced apart fixed walls occupying planes normal to the longitudinal axis of the key or key blank; a stop member confined between said walls and held thereby against lateral motion while enabling edgewise motion thereof in a plane parallel to said walls; a part on said stop member engageable with a shoulder on a key or key blank; and means pivotally retaining said stop member in position between said walls.

9. In a machine for operating upon a key or key blank and wherein accurate positioning of the key or key blank is necessary: a retractable stop for gauging and locating the key in a lengthwise direction comprising, spaced apart fixed walls occupying planes normal to the longitudinal axis of the key or key blank; a stop member confined between said walls and held thereby against lateral motion while enabling edgewise motion thereof in a plane parallel to said walls; a part on said stop member engageable with a shoulder on a key or key blank; and means pivotally and slidably retaining said stop member in position between said walls.

10. In a machine for operating upon a key or key blank and wherein accurate positioning of the key or key blank is necessary: a retractable stop for gauging and locating the key in a lengthwise direction comprising, spaced apart fixed walls occupying planes normal to the longitudinal axis of the key or key blank; a stop member confined between said walls and held thereby against lateral motion while enabling edgewise motion thereof in a plane parallel to said walls; a part on said stop member engageable with a shoulder on a key or key blank; and means pivotally and slidably retaining said stop member in position between said walls, said means comprising, a slot in the stop member, and a spring pressed plunger mounted in one of said walls and projected toward the other wall to engage in said slot.

11. In a machine for operating upon a key or key blank and wherein accurate positioning of the key or key blank is necessary: a retractable stop for gauging and locating the key in a lengthwise direction comprising, spaced apart fixed walls occupying planes normal to the longitudinal axis of the key or key blank; a stop member confined between said walls and held thereby against lateral motion while enabling edgewise motion thereof in a plane parallel to said walls; a part on said stop member engageable with a shoulder on a key or key blank; and means pivotally and slidably retaining said stop member in position between said walls, said means comprising, a slot in the stop member having spaced enlargements to define detents, a spring plunger seated in a well in one of said walls and projected toward the other wall, and a rounded shoulder on the plunger engaging the edges of the slot, said rounded shoulder being larger than the enlargements in the slot so that the plunger upon engaging in one of said enlargements provides a well defined pivot for the stop member.

12. In a key cutting and duplicating machine: a movable carriage; a reversible key carrying block having different types of key positioning means at opposite edges thereof; a seat on the movable carriage for the block; interfitting tongue and groove positioning means on the seat and the block for firmly holding the block against lateral motion on the seat in either of two positions; a stud projecting from the seat, the block having a round hole to receive the stud; and a polygonal base for the stud having a major and a minor transverse dimension, the former being substantially equal to the diameter of the round hole in the block and being disposed in a plane substantially parallel with the tongue and groove locating means to accurately hold the block against lateral motion along the axis of said tongue and groove locating means, and the minor transverse dimension being less than the diameter of said round hole in the block and extending in a plane normal to the axis of said tongue and groove connection so as not to interfere with proper functioning thereof.

13. In a key cutting and duplicating machine of the character described: a base having spaced pedestals projecting therefrom; a rotatable cutting tool journalled in one pedestal; an adjustable tracing and locating finger carried by the other pedestal; a key blank carriage; means for clamping a key blank and a pattern key thereto; means hingedly and slidably mounting said carriage on the base so that the carriage may be moved to engage the pattern key with the adjustable tracing and locating finger while the key blank is engaged with the rotatable cutting tool; the second named pedestal having a bore opening toward the carriage; an adjustable stop seated in the bore with its outer end in position to be engaged by the carriage at a point at which the carriage clears the cutting tool; and means for locking said stop in its adjusted position comprising, a longitudinal slot in the portion of the stop received within the bore, a wedge disposed transversely in said slot, and a screw threaded in the pedestal for driving the wedge into said slot.

14. In a key cutting and duplicating machine having a cutting tool and a key carriage for bringing a key into operative relationship to the cutting tool: a base block; cooperating means on the base block and the carriage for firmly and accurately holding the block on the carriage with either one or two opposite sides presented to the cutting tool, said base block having a step in the top of one of said two edges defining a key supporting ledge and a locating shoulder for the reception of straight backed single bitted keys; a ridge projecting up from the top of the opposite edge of the base block of a width to fit accurately into the longitudinal grooves of double bitted keys; and a clamping member cooperable with said base block in either of its two positions of adjustment for clamping a key blank to the base block.

15. In a key cutting and duplicating machine having a cutting tool and a key carriage for bringing a key into operative relationship to the cutting tool: a base block; cooperating means on the base block and the carriage for firmly and accurately holding the block on the carriage with either one of two opposite sides presented to the cutting tool, said base block having a step in the top of one of said two edges defining a key supporting ledge and a locating shoulder for the reception of straight backed single bitted keys; a ridge projecting up from the top of the opposite edge of the base block of a width to fit accurately into the longitudinal grooves of double bitted keys; a clamping member cooperable with said base block in either of its two positions of adjustment for clamping a key blank to the base block; and common means for drawing the clamping member down against the base block and for securing the base block to the carriage.

16. In a key cutting and duplicating machine: a base to which key blanks are securable, said base having a shouldered ledge upon which the blade of the blank rests with its back edge in engagement with the shoulder and with its grooved face up; a removable longitudinal key blank locator in the form of a length of wire of a size to be received in the longitudinal groove in the upper face of the key blank and having an inturned hook; said base having a notch to receive the inturned hook, said notch being so located that a key blank having its nose contacting the inturned hook is properly located in an endwise direction; and a clamping member having a key engaging portion arranged to press down on the portion of the wire locator received in the key blank groove.

17. In a machine for operating on keys and key blanks: a carriage; a block seated on the carriage and having a key supporting surface, and a key locating shoulder; a clamp disposed above the block and having a portion at one end engageable with a key on the supporting surface to clamp the key to the block, said clamp having an angular portion at its opposite end engageable with a surface on the carriage to produce lateral motion of the clamp when the same is forced into clamping engagement with the key in a direction to draw the key against said locating shoulder; a stud projecting from the support and passing through aligned openings in the block and clamp, the opening in the clamp being elongated to permit lateral motion of the clamp with respect to the stud and the block; a coil spring encircling the stud and confined between the block and clamp so as to exert a releasing force on the clamp tending to lift the same away from the block, said spring having the coils adjacent to its opposite ends eccentric to the stud and arranged to produce a component of force on the clamp operable to move the same laterally during release of the clamp in a direction such that its key engaging end moves away from said key locating shoulder; and a clamping nut threaded on the stud for tightening and releasing the clamp.

18. In a key cutting and duplicating machine having a key carriage: a vise for securing a key blank to the carriage comprising, a detachable base on the carriage seated thereon in a manner such as to enable application of the base to the carriage in either of two different positions, said base being stepped at opposite edges to provide a ledge and a positioning shoulder at said opposite edges of the base; a clamp having a key engaging portion arranged to press against a key blank resting on one of said ledges and to clamp the key blank to the carriage through the base in either position of the base on the carriage to thereby effect securement of both the key blank and base to the carriage; means for forcing the clamp toward said ledge and the carriage; cooperating means on the carriage and the clamp for imparting a lateral motion to the clamp so that the key engaging portion of the clamp moves in a direction toward the shoulder adjacent thereto and whereby the clamp draws the key blank firmly against said shoulder during the clamping action; and means on the carriage engaged by the base in either position of the base on the carriage for holding the base against motion relative to the carriage during lateral motion of the clamp.

19. In a key cutting and duplicating machine having a key carriage: means on the carriage for gripping keys or key blanks comprising, a base member reversibly seated on the carriage and having opposite edge portions adapted to support a key or key blank, said base being arranged to be readily detachably clamped to the carriage; an abutment at each of said edge portions for engagement with a key or key blank to position the same laterally of the base; a clamping member having a clamping jaw overhanging one of said edge portions in either position of the base and engageable with a key or key blank supported on said edge portion to clamp the same to the carriage through the base member; means for forcing the clamping member toward the carriage to clamp the base member and key thereto; and cooperating means on the clamping member and the carriage for imparting a lateral motion to the clamping member in a direction such that the clamping jaw of said clamping member moves toward the abutment adjacent thereto as the clamping member is forced toward the base member to thereby draw the key or blank firmly against said abutment.

EDWARD N. JACOBI.